United States Patent
Tien et al.

(10) Patent No.: US 12,386,459 B2
(45) Date of Patent: Aug. 12, 2025

(54) ELECTRONIC DEVICE

(71) Applicant: CARUX TECHNOLOGY PTE. LTD., Singapore (SG)

(72) Inventors: I-Cheng Tien, Tainan (TW); Ming-Hong Yao, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/628,834

(22) Filed: Apr. 8, 2024

(65) Prior Publication Data
US 2024/0377908 A1    Nov. 14, 2024

(30) Foreign Application Priority Data
May 9, 2023    (CN) .......................... 202310517028.1

(51) Int. Cl.
*G06F 3/041*    (2006.01)
(52) U.S. Cl.
CPC ...... *G06F 3/04182* (2019.05); *G06F 3/04184* (2019.05)

(58) Field of Classification Search
CPC .......................... G06F 3/04182; G06F 3/04184
See application file for complete search history.

(56) References Cited

U.S. PATENT DOCUMENTS

| 2016/0011441 | A1* | 1/2016 | Schwartz | G02F 1/161 |
| | | | | 359/275 |
| 2019/0042047 | A1* | 2/2019 | Liao | H10D 86/60 |
| 2020/0050033 | A1* | 2/2020 | Galwaduge | G02F 1/1685 |
| 2021/0191562 | A1* | 6/2021 | Han | G06F 3/04182 |

FOREIGN PATENT DOCUMENTS

CN    102725715    10/2012

* cited by examiner

*Primary Examiner* — Jonathan A Boyd
(74) *Attorney, Agent, or Firm* — JCIPRNET

(57) ABSTRACT

An electronic device is provided. The electronic device includes a display panel, a first privacy layer, and a sensing layer. The first privacy layer is disposed on the display panel and receives a first driving signal. The sensing layer is disposed on the first privacy layer and receives a sensing driving signal. A starting time of the sensing driving signal is later than a starting time of the first driving signal.

16 Claims, 4 Drawing Sheets

ELECTRONIC DEVICE

CROSS-REFERENCE TO RELATED APPLICATION

This application claims the priority benefit of China application serial no. 202310517028.1, filed on May 9, 2023. The entirety of the above-mentioned patent application is hereby incorporated by reference herein and made a part of this specification.

BACKGROUND

Technical Field

The disclosure relates to an electronic device, and in particular to a display driving device.

Description of Related Art

In some specific-purpose displays, displays with privacy functions are used. For example, in order to reduce the danger caused by the driver being distracted due to watching the video that the passenger in the passenger seat is watching while driving the vehicle, the car screen has the privacy function. In the prior art, due to the stack design of the electronic device with the privacy function, noise signals may be generated when the privacy layer is switched during action. Also, since the privacy layer is closer to the sensing layer, the noise signals generated by the privacy layer tend to be present during the scanning interval of the touch sensing operation, thereby affecting the touch sensing operation of the electronic device, such as causing signal errors to generate false alarm points.

SUMMARY

The disclosure provides an electronic device, which can reduce interference on a touch sensing operation of the electronic device through avoiding a noise signal generated by interactive coupling between a privacy layer and a sensing layer.

An electronic device of the disclosure includes a display panel, a first privacy layer, and a sensing layer. The first privacy layer is disposed on the display panel and receives a first driving signal. The sensing layer is disposed on the first privacy layer and receives a sensing driving signal. A starting time of the sensing driving signal is later than a starting time of the first driving signal.

In an embodiment of the disclosure, the electronic device further includes a second privacy layer. The display panel is disposed between the first privacy layer and the second privacy layer, and the second privacy layer receives a second driving signal. A starting time of the second driving signal is the same as the starting time of the first driving signal.

In an embodiment of the disclosure, the electronic device further includes a backlight. The second privacy layer is disposed between the display panel and the backlight, and the backlight is used to provide a light source required by the display panel.

In an embodiment of the disclosure, the electronic device further includes a sensing driving circuit. The sensing driving circuit is electrically connected to the sensing layer and is used to output the sensing driving signal.

In an embodiment of the disclosure, the sensing driving circuit generates the sensing driving signal according to a synchronizing signal.

In an embodiment of the disclosure, a starting time of the synchronizing signal is later than the starting time of the first driving signal.

In an embodiment of the disclosure, the electronic device further includes a microprocessor. The microprocessor is electrically connected to the sensing driving circuit and is used to generate the synchronizing signal according to the first driving signal.

In an embodiment of the disclosure, the electronic device further includes a first driving circuit and a second driving circuit. The first driving circuit is electrically connected to the microprocessor and the first privacy layer, and is used to output the first driving signal. The second driving circuit is electrically connected to the microprocessor and the second privacy layer, and is used to output a second driving signal.

An electronic device of the disclosure includes a display panel, a first privacy layer, and a sensing layer. The first privacy layer is disposed on the display panel and receives a first driving signal. The sensing layer is disposed on the first privacy layer and receives a sensing driving signal. The sensing driving signal operates in at least one frequency band among multiple frequency bands of a noise signal.

In an embodiment of the disclosure, the electronic device further includes a second privacy layer. The display panel is disposed between the first privacy layer and the second privacy layer, and the second privacy layer receives a second driving signal.

In an embodiment of the disclosure, the electronic device further includes a backlight. The second privacy layer is disposed between the display panel and the backlight, and the backlight is used to provide a light source required by the display panel.

In an embodiment of the disclosure, the electronic device further includes a sensing driving circuit. The sensing driving circuit is electrically connected to the sensing layer and is used to output the sensing driving signal.

In an embodiment of the disclosure, information of the frequency bands of the noise signal is pre-stored in the sensing driving circuit. The sensing driving circuit selects at least one frequency band from the frequency bands as an operating frequency of the sensing driving signal.

In the embodiment of the disclosure, the noise signal is generated by interactive coupling between the first privacy layer and the sensing layer. The sensing driving circuit selects a first frequency band from the frequency bands as the operating frequency of the sensing driving signal.

In the embodiments of the disclosure, the noise signal is generated by an external power source or another electronic device close to the electronic device. The sensing driving circuit selects another frequency band other than the first frequency band from the frequency bands as the operating frequency of the sensing driving signal.

In an embodiment of the disclosure, noise of the frequency bands of the noise signal is lower than noise of other frequency bands of the noise signal.

In order for the features and advantages of the disclosure to be more comprehensible, the following specific embodiments are described in detail in conjunction with the drawings.

DESCRIPTION OF THE EMBODIMENTS

Figure 1:
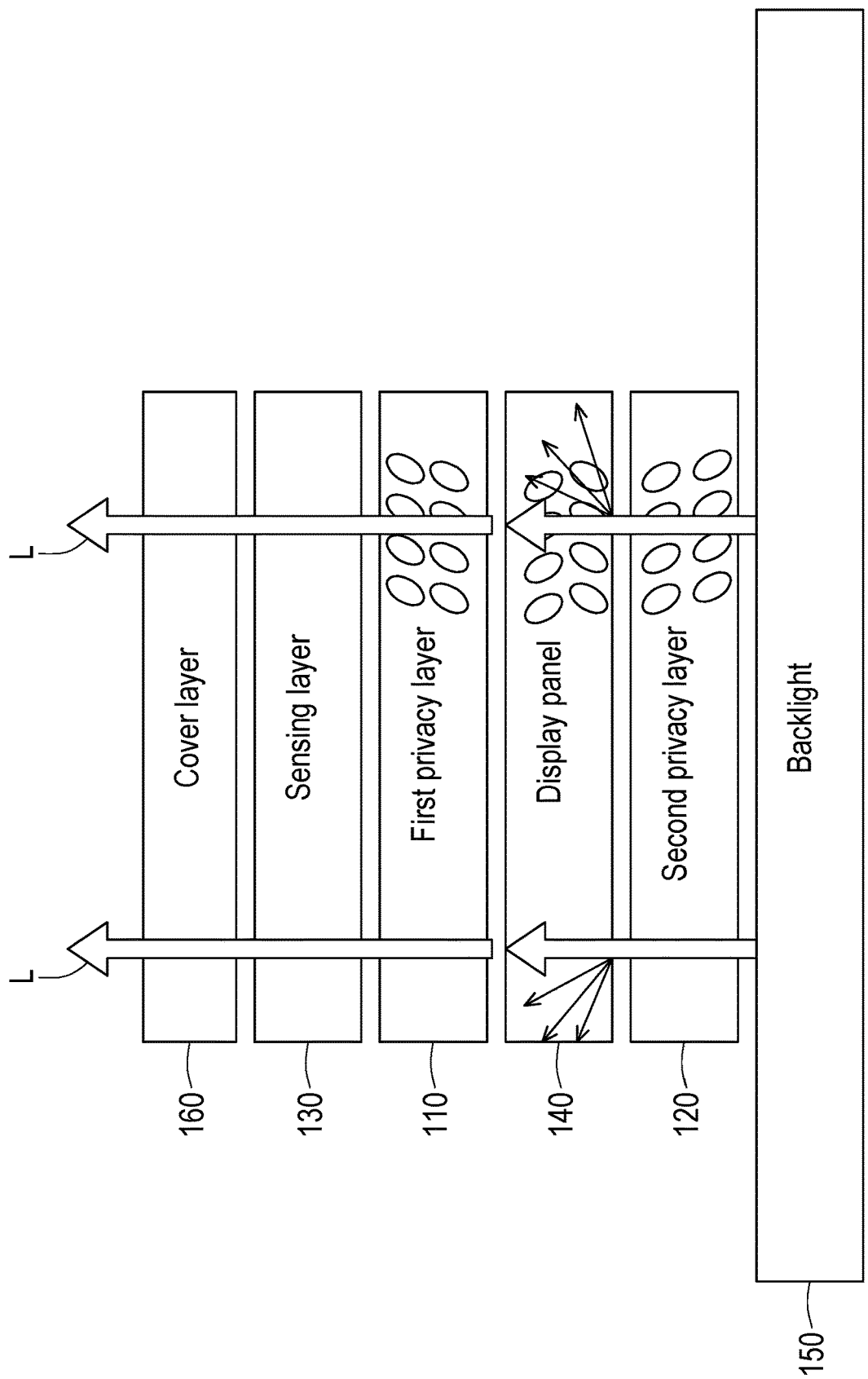
FIG. 1 is a schematic structural diagram of an electronic device according to an embodiment of the disclosure.

The disclosure may be understood by referring to the following detailed description in conjunction with the drawings. It should be noted that in order to facilitate the understanding of the reader and the brevity of the drawings, multiple drawings in the disclosure only depict a part of an electronic device, and specific components in the drawings are not drawn according to actual scale. In addition, the number and the size of each component in the drawings are for illustration only and are not intended to limit the scope of the disclosure.

In the following specification and claims, terms such as "containing" and "including" are open-ended terms, so the terms should be interpreted as "containing but not limited to . . . ".

It should be understood that although the terms first, second, third . . . may be used to describe various constituent components, the constituent components are not limited by the terms. The terms are only used to distinguish a single constituent component from other constituent components in the specification. The same terms may not be used in the claims, but are replaced by first, second, third . . . according to the order of declaration of the components in the claims. Therefore, a first constituent component in the specification below may be a second constituent component in the claims.

In some embodiments of the disclosure, terms such as "connection" and "interconnection" related to bonding and connection, unless otherwise specified, may mean that two structures are in direct contact or may also mean that the two structures are not in direct contact, wherein there is another structure disposed between the two structures. The terms related to bonding and connection may also include the case where the two structures are both movable or the two structures are both fixed. In addition, the term "coupling" includes any direct and indirect electrical connection means. In the case of direct electrical connection, terminals of components on two circuits are directly connected or connected to each other by a conductor line segment, and in the case of indirect electrical connection, there is a switch, a diode, a capacitor, an inductor, a resistor, other suitable components, or a combination of the above components between the terminals of the components on the two circuits, but not limited thereto.

The electronic device of the disclosure may include a display device, an antenna device, a sensing device, a light emitting device, or a splicing device, but not limited thereto. The electronic device may include a bendable or flexible electronic device. The electronic device may include an electronic component. The electronic device includes, for example, a liquid crystal layer or a light emitting diode (LED). The electronic component may include a passive component and an active component, such as a capacitor, a resistor, an inductor, a variable capacitor, a filter, a diode, a transistor, a sensor, a microelectromechanical system (MEMS), a liquid crystal chip, a controller, etc, but not limited thereto. The diode may include a light emitting diode or a photodiode. The light emitting diode may, for example, include an organic light emitting diode (OLED), a mini LED, a micro LED, a quantum dot LED, fluorescence, (phosphor), other suitable materials, or a combination of the above, but not limited thereto. The sensor may, for example, include a capacitive sensor, an optical sensor, an electromagnetic sensor, a fingerprint sensor (FPS), a touch sensor, an antenna, a pen sensor, etc., but not limited thereto. The controller may, for example, include a timing controller, etc., but not limited thereto. In the following, the display device will be used as the electronic device to illustrate the disclosure, but the disclosure is not limited thereto.

Reference will now be made in detail to the exemplary embodiments of the disclosure, examples of the exemplary embodiments are illustrated in the drawings. Wherever possible, the same reference numerals are used in the drawings and the description to refer to the same or similar parts.

Figure 2:
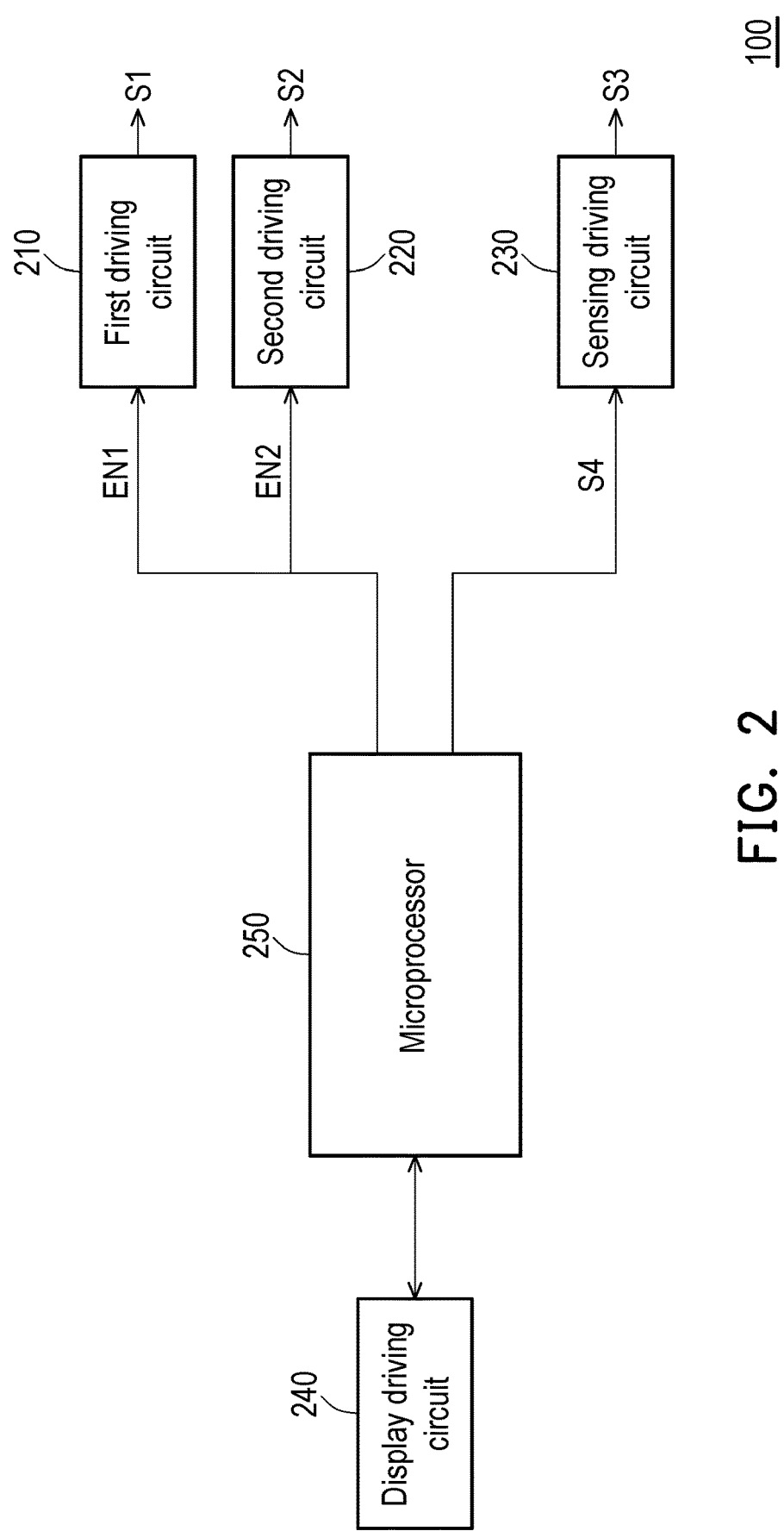
FIG. 2 is a schematic block diagram of an electronic device according to an embodiment of the disclosure.

FIG. 1 is a schematic structural diagram of an electronic device according to an embodiment of the disclosure. FIG. 2 is a schematic block diagram of an electronic device according to an embodiment of the disclosure. Please refer to FIG. 1 and FIG. 2. In FIG. 1, a stack design of an electronic device 100 includes cover layer 160, a sensing layer 130, a first privacy layer 110, a display panel 140, a second privacy layer 120, and a backlight 150.

The cover layer 160 is disposed on the first privacy layer 110 and is used to protect other layers, such as the sensing layer 130, the first privacy layer 110, and the display panel 140, in the electronic device. The material of the cover layer 160 may be a transparent material, such as glass and a sapphire substrate, but the disclosure is not limited thereto. The first privacy layer 110 is disposed on the display panel 140 and receives a first driving signal S1. The sensing layer 130 is disposed on the first privacy layer 110 and receives a sensing driving signal S3. The display panel 140 is disposed between the first privacy layer 110 and the second privacy layer 120, and the second privacy layer 120 receives a second driving signal S2. The second privacy layer 120 is disposed between the display panel 140 and the backlight 150, and the backlight 150 is used to provide a light L required by the display panel 140. It should be noted that the intensity of the light L may be weakened layer by layer due to the relationship between layers, such as the display panel 140 and the privacy layers 110 and 120. Therefore, the light intensity when the light L finally enters the human eye is less than the light intensity when the light L is emitted from the backlight 150. In addition, the first driving signal S1 and the second driving signal S2 may respectively be clock signals of the first privacy layer 110 and the second privacy layer 120, but the disclosure is not limited thereto.

The electronic device 100 of the embodiment includes the first privacy layer 110 and the second privacy layer 120, so the electronic device 100 has a privacy function, and in order to achieve an improved privacy effect, the first privacy layer 110 is designed to be disposed on the display panel 140. In addition, in the embodiment, since the first privacy layer 110 is disposed between the display panel 140 and the sensing layer 130, the influence of a noise signal of the display panel 140 on the sensing layer 130 can be reduced. As mentioned above, through switching the state of the first privacy layer 110 and/or the second privacy layer 120, the danger caused by a driver being distracted due to watching a video that a passenger in a passenger seat is watching while driving a vehicle can be reduced.

In FIG. 2, the driving circuit design of the electronic device 100 includes a first driving circuit 210, a second driving circuit 220, a sensing driving circuit 230, a display driving circuit 240, and a microprocessor 250. The sensing driving circuit 230 is electrically connected to the sensing layer 130 and is used to output the sensing driving signal S3 to drive the sensing layer 130 to perform a touch sensing operation. The microprocessor 250 is electrically connected to the sensing driving circuit 230. The first driving circuit 210 is electrically connected to the microprocessor 230 and the first privacy layer 110, and is used to output the first driving signal S1 to drive the first privacy layer 110. The second driving circuit 220 is electrically connected to the microprocessor 230 and the second privacy layer 120, and is used to output the second driving signal S2 to drive the second privacy layer 120. In addition, the microprocessor 250 may respectively control operations of the first driving circuit 210 and the second driving circuit 220 through control signals EN1 and EN2. It should be noted that the driving circuit design of FIG. 2 is only an example, and the disclosure is not limited thereto.

Figure 3:
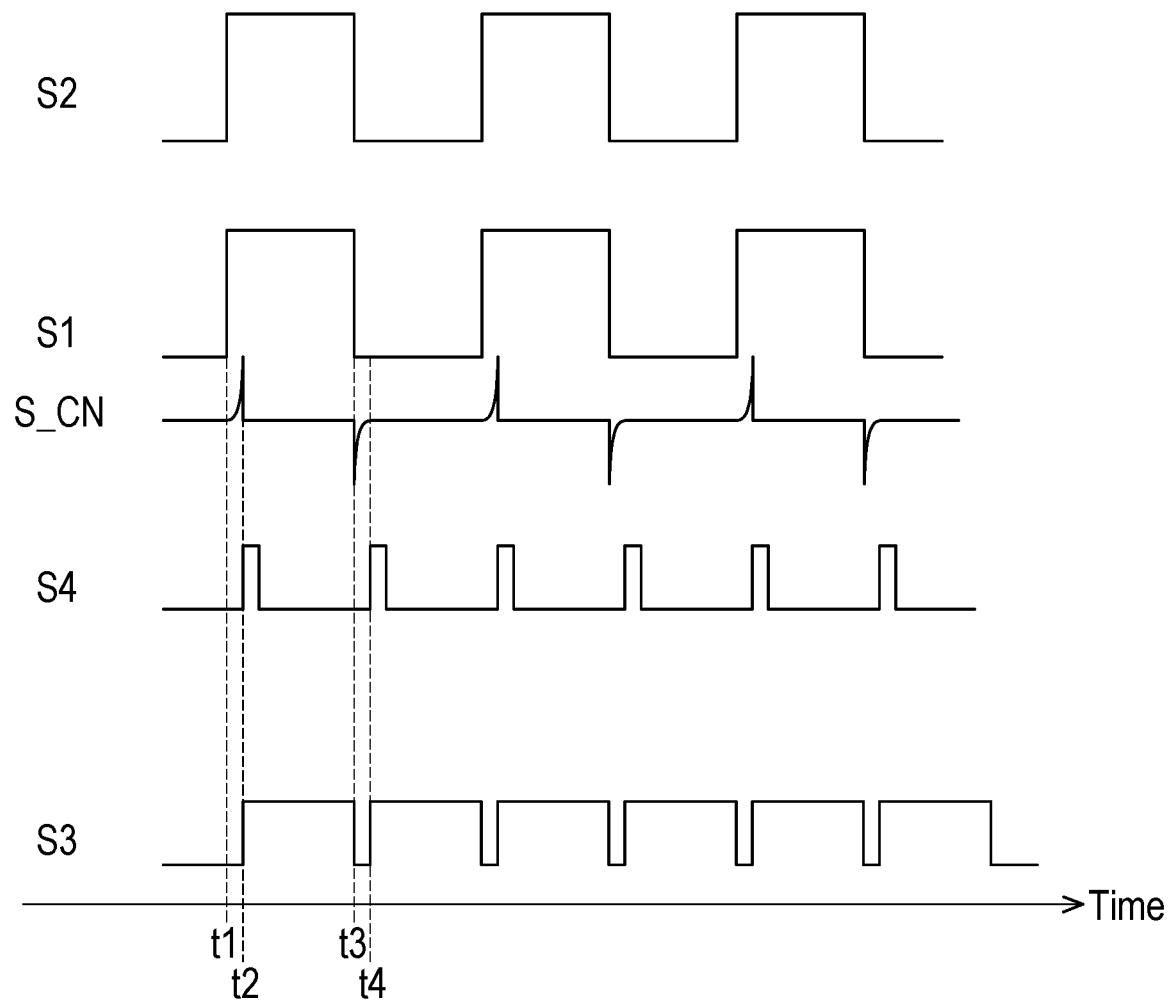
FIG. 3 is a schematic diagram of waveforms of signals of the electronic device of FIG. 2.

FIG. 3 is a schematic diagram of waveforms of signals of the electronic device of FIG. 2. As mentioned above, the first driving signal S1 and the second driving signal S2 are respectively the clock signals of the first privacy layer 110 and the second privacy layer 120. A starting time t1 of the second driving signal S2 is the same as a starting time t1 of the first driving signal S1. As shown in FIG. 3, when the voltage of the first driving signal S1 is rising, a change in the voltage generates a noise signal S_CN. Also, since the first privacy layer 110 is closer to the sensing layer 140, the noise signal S_CN generated by the first privacy layer 110 may be easily present during a scanning interval of the sensing driving circuit 240, thereby affecting the touch sensing operation of the electronic device 100, such as causing a signal error to generate a false alarm point. Therefore, in order to reduce interference on the touch sensing operation by the noise signal S_CN, a starting time t2 of the sensing driving signal S3 of the embodiment is later than the starting time t1 of the first driving signal S1.

Specifically, in some embodiments, the microprocessor 250 is used to generate a synchronizing signal S4 according to the first driving signal S1, and output the synchronizing signal S4 to the sensing driving circuit 240. Next, the sensing driving circuit 240 generates the sensing driving signal S3 according to the synchronizing signal S4, and outputs the sensing driving signal S3 to the sensing layer 130, so as to drive the sensing layer 130 to perform the touch sensing operation. A starting time t2 of the synchronizing signal S4 is the same as the starting time t2 of the sensing driving signal S3. In order for the starting time t2 of the sensing driving signal S3 to be later than the starting time t1 of the first driving signal S1, the starting time t2 of the synchronizing signal S4 generated by the microprocessor 250 according to the first driving signal S1 is also later than the starting time t1 of the first driving signal S1. In this way, the interference on the touch sensing operation (for example, during the scanning interval between starting times t2 and t3) by the noise signal S_CN can be reduced.

In addition, at the starting time t3, since the first driving signal S1 is also in a switching state (for example, a falling edge), the noise signal S_CN is generated. Therefore, in order to reduce the interference on the touch sensing operation by the noise signal S_CN, a starting time t4 of the sensing driving signal S3 of the embodiment is also designed to be later than a starting time t3 of the first driving signal S1. It should be noted that since the source of the noise signal may be generated by interactive coupling between the first privacy layer 110 and the sensing layer 130, the noise signal may be obtained by measuring an output signal of the sensing layer 130. In addition, a gap between the starting times t2 and t1 (and/or the starting times t3 and t4) may be a default value. The default value may be determined according to experimental or simulated results or a specification provided by a customer, but not limited thereto. In addition, the gap may be the same as the time length of the noise signal S_CN, but not limited thereto. For example, in some embodiments, the gap may be slightly shorter than the time length of the noise signal S_CN.

Therefore, in the embodiment, since the noise signal S_CN generated by the first driving signal S1 occurs at a fixed frequency, in some embodiments, the microprocessor 250 judges the rising edge and the falling edge of the first driving signal S1, generates the synchronizing signal S4, and provides the synchronizing signal S4 to the sensing driving circuit 240 as the basis for generating the sensing driving signal S3, so that the sensing driving circuit 240 completes the scanning interval between the starting times t2 and t3, and reduces the influence of the noise signal S_CN on the touch sensing operation of the electronic device 100. In some other embodiments, the microprocessor 250 generates the synchronizing signal S4 at a default frequency, and the synchronizing signal S4 may be the same as the frequency of the first driving signal S1 and/or the second driving signal S2.

In addition to delaying the starting time of the first driving signal S1 to reduce the influence of the noise signal, the disclosure can also reduce the influence of the noise signal through frequency band selection, as described below.

Figure 4:
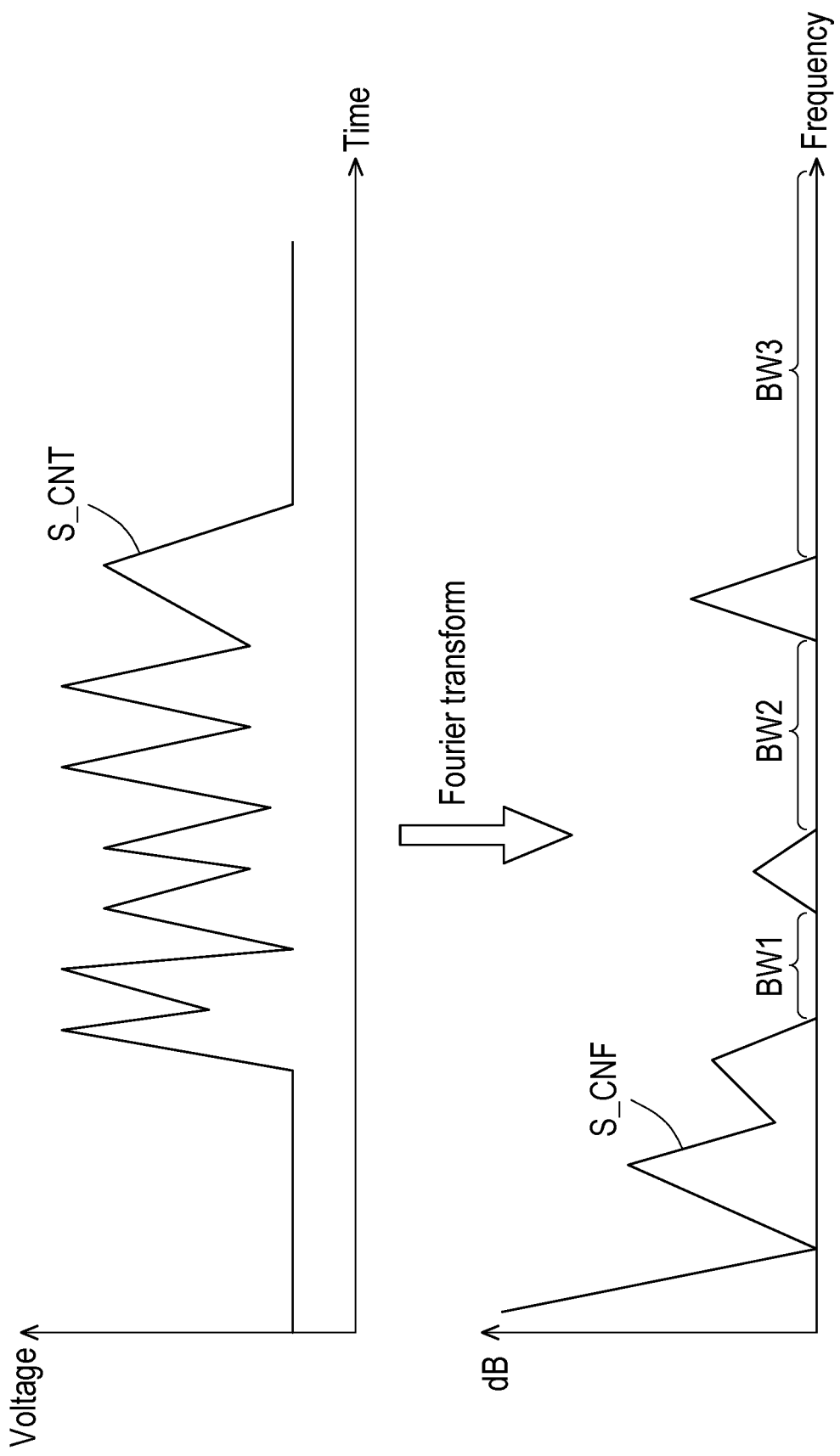
FIG. 4 is a schematic diagram of a noise signal undergoing Fourier transform according to an embodiment of the disclosure.

FIG. 4 is a schematic diagram of a noise signal undergoing Fourier transform according to an embodiment of the disclosure. Please refer to FIG. 2 and FIG. 4. The source of a noise signal S_CNT may be generated by the interactive coupling between the first privacy layer 110 and the sensing layer 130 or the source of the noise signal S_CNT may also be generated by an external power source or another electronic device close to the electronic device 100. Taking a mobile device as the electronic device 100 as an example, the external power source is, for example, a charging power source of the electronic device 100, and the other electronic device is, for example, another mobile device close to the electronic device 100.

The noise signal S_CNF in a frequency domain (that is, a frequency distribution diagram corresponding to the noise signal S_CNT) is obtained after the noise signal S_CNT in a time domain undergoes Fourier transform. In a time domain diagram, the noise signal S_CNF includes, but is not limited to, multiple frequency bands BW1, BW2, and BW3, and the noise of the frequency bands BW1, BW2, and BW3 is lower than the noise of other frequency bands. Therefore, the sensing driving signal S3 may operate in at least one of the frequency bands BW1, BW2, and BW3 of the noise signal S_CNF to reduce the influence of the noise signal S_CNF on the touch sensing operation of the electronic device 100. In an embodiment, the frequency band selection of the sensing driving signal S3 may be performed in the sensing driving circuit 230 or may be executed in other circuits other than the electronic device 100.

Specifically, information of the frequency bands BW1, BW2, and BW3 with lower noise of the noise signal S_CNF may be pre-stored in the sensing driving circuit 230. Next, the sensing driving circuit 230 selects at least one frequency band from the frequency bands BW1, BW2, and BW3 as an operating frequency of the sensing driving signal S3, so as to reduce the interference of the noise signal S_CNT. It should be noted that the operating manner of the electronic device corresponding to FIG. 4 and the operating manner of the electronic device corresponding to FIG. 3 may be operated independently or together. For example, in the embodiment of FIG. 4, after the sensing driving circuit 230 selects at least one frequency band from the frequency bands BW1, BW2, and BW3 as the operating frequency of the sensing driving signal S3, the operating frequency of the synchronizing signal S4 is also located in the same frequency band (the same operating frequency) as the sensing driving signal S3. Also, it can be seen from the previous description that when the operating manner of the electronic device corresponding to FIG. 4 and the operating manner of the electronic device corresponding to FIG. 3 are executed together, since the starting time t2 of the synchronizing signal S4 and the starting time t1 of the first driving signal S1 are the default value, the first driving signal S1 at this time is also located in the same frequency band (the same operating frequency) as the sensing driving signal S3.

In addition, in the sensing driving circuit 230, the operating frequency of the sensing driving signal S3 may jump from one frequency band (for example, the frequency band BW1) to another frequency band (for example, the frequency band BW2) according to actual conditions.

In summary, in the embodiments of the disclosure, the sensing driving circuit may delay the starting time of the first driving signal according to the synchronizing signal provided by the microprocessor, so as to reduce the influence of the noise signal on the touch sensing operation. In addition, the sensing driving circuit may also select the operating frequency with lower noise as the sensing driving signal according to the pre-stored information, so as to reduce the interference of the noise signal.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An electronic device, comprising:
    a display panel;
    a first privacy layer, disposed on the display panel and receiving a first driving signal; and
    a sensing layer, disposed on the first privacy layer and receiving a sensing driving signal; and
    a sensing driving circuit, electrically connected to the sensing layer and used to output the sensing driving signal,
    wherein the sensing driving circuit generates the sensing driving signal according to a synchronizing signal,
    wherein the synchronizing signal is generated according to the first driving signal, and
    wherein a starting time of the sensing driving signal is later than a starting time of the first driving signal.

2. The electronic device according to claim 1, further comprising:
    a second privacy layer, wherein the display panel is disposed between the first privacy layer and the second privacy layer, and the second privacy layer receives a second driving signal,
    wherein a starting time of the second driving signal is the same as the starting time of the first driving signal.

3. The electronic device according to claim 2, further comprising:
    a backlight, wherein the second privacy layer is disposed between the display panel and the backlight, and the backlight is used to provide a light source required by the display panel.

4. The electronic device according to claim 1, wherein a starting time of the synchronizing signal is later than the starting time of the first driving signal.

5. The electronic device according to claim 4, further comprising:
    a second privacy layer, wherein the display panel is disposed between the first privacy layer and the second privacy layer;
    a first driving circuit, electrically connected to the first privacy layer;
    a second driving circuit, electrically connected to the second privacy layer;
    a microprocessor, electrically connected to the sensing driving circuit, the first driving circuit, and the second driving circuit.

6. The electronic device according to claim 4, further comprising:
    a first driving circuit, electrically connected to the microprocessor and the first privacy layer, and used to output the first driving signal; and
    a second driving circuit, electrically connected to the microprocessor and a second privacy layer, and used to output a second driving signal.

7. An electronic device, comprising:
    a display panel;
    a first privacy layer, disposed on the display panel and receiving a first driving signal; and
    a sensing layer, disposed on the first privacy layer and receiving a sensing driving signal,
    wherein the sensing driving signal operates in at least one frequency band among a plurality of frequency bands of a noise signal, and the noise signal may be obtained by measuring an output signal of the sensing layer;
    a sensing driving circuit, electrically connected to the sensing layer and used to output the sensing driving signal, wherein information of the frequency bands of the noise signal is pre-stored in the sensing driving circuit, and the sensing driving circuit selects the at least one frequency band from the frequency bands as an operating frequency of the sensing driving signal.

8. The electronic device according to claim 7, further comprising:
    a second privacy layer, wherein the display panel is disposed between the first privacy layer and the second privacy layer, and the second privacy layer receives a second driving signal.

9. The electronic device according to claim 8, further comprising:
    a backlight, wherein the second privacy layer is disposed between the display panel and the backlight, and the backlight is used to provide a light source required by the display panel.

10. The electronic device according to claim 8, wherein the sensing driving circuit generates the sensing driving signal according to a synchronizing signal.

11. The electronic device according to claim 10, wherein the synchronizing signal is located in a same frequency band as the sensing driving signal.

12. The electronic device according to claim 8, wherein the noise signal is generated by interactive coupling between the first privacy layer and the sensing layer.

13. The electronic device according to claim 12, wherein the sensing driving circuit selects a first frequency band from the frequency bands as the operating frequency of the sensing driving signal.

14. The electronic device according to claim 8, wherein the noise signal is generated by an external power source or another electronic device close to the electronic device.

15. The electronic device according to claim 14, wherein the sensing driving circuit selects another frequency band other than the first frequency band from the frequency bands as the operating frequency of the sensing driving signal.

16. The electronic device according to claim 7, wherein noise of the selected frequency bands of the noise signal is lower than noise of other frequency bands of the noise signal.

* * * * *